(12) United States Patent
Hale et al.

(10) Patent No.: US 7,297,736 B2
(45) Date of Patent: Nov. 20, 2007

(54) NEOPENTYL GLYCOL CONTAINING POLYESTERS BLENDED WITH POLYCARBONATES

(75) Inventors: Wesley Raymond Hale, Kingsport, TN (US); Thomas Joseph Pecorini, Kingsport, TN (US); Sam Richard Turner, Kingsport, TN (US)

(73) Assignee: Eastman Chemical Company, Kingsport, TN (US)

( * ) Notice: Subject to any disclaimer, the term of this patent is extended or adjusted under 35 U.S.C. 154(b) by 297 days.

(21) Appl. No.: 10/975,257

(22) Filed: Oct. 28, 2004

(65) Prior Publication Data

US 2006/0100393 A1 May 11, 2006

(51) Int. Cl.
C08L 69/00 (2006.01)
C08L 67/02 (2006.01)
(52) U.S. Cl. .................. 524/140; 524/147; 525/439
(58) Field of Classification Search .............. None
See application file for complete search history.

(56) References Cited

U.S. PATENT DOCUMENTS

| | | | |
|---|---|---|---|
| 3,030,335 A | 4/1962 | Goldberg | |
| 3,317,466 A | 5/1967 | Caldwell et al. | |
| 3,541,059 A | 11/1970 | Schaper | |
| RE27,682 E | 6/1973 | Schnell et al. | |
| 3,799,953 A | 3/1974 | Freitag et al. | |
| 3,907,754 A | 9/1975 | Tershansy et al. | |
| 3,962,189 A | 6/1976 | Russin et al. | |
| 4,001,184 A | 1/1977 | Scott | |
| 4,001,884 A | 1/1977 | Herbst et al. | |
| 4,010,145 A | 3/1977 | Russin et al. | |
| 4,185,009 A | 1/1980 | Idel et al. | |
| 4,188,314 A | 2/1980 | Fox et al. | |
| 4,286,083 A | 8/1981 | Kochanowski | |
| 4,356,299 A | 10/1982 | Cholod et al. | |
| 4,391,954 A | 7/1983 | Scott | |
| 4,431,793 A | 2/1984 | Rosenquist | |
| 4,469,861 A | 9/1984 | Mark et al. | |
| 4,474,999 A | 10/1984 | Mark et al. | |
| 4,619,976 A | 10/1986 | Morris et al. | |
| 4,645,802 A | 2/1987 | Jackson, Jr. et al. | |
| 4,749,773 A | 6/1988 | Weaver et al. | |
| 4,786,692 A | 11/1988 | Allen et al. | |
| 4,826,903 A | 5/1989 | Weaver et al. | |
| 4,845,188 A | 7/1989 | Weaver et al. | |
| 4,882,412 A | 11/1989 | Weaver et al. | |
| 4,892,922 A | 1/1990 | Weaver et al. | |
| 4,892,923 A | 1/1990 | Weaver et al. | |
| 5,017,680 A | 5/1991 | Sublett | |
| 5,142,088 A | 8/1992 | Phelps et al. | |
| 5,191,038 A | 3/1993 | Krabbenhoft et al. | |
| 5,262,511 A | 11/1993 | Caringi et al. | |
| 5,290,631 A | 3/1994 | Fleury et al. | |
| 5,489,665 A | 2/1996 | Yamato et al. | |
| 5,494,992 A | 2/1996 | Kanno et al. | |
| 5,498,688 A | 3/1996 | Oshino et al. | |
| 5,654,347 A | 8/1997 | Khemani et al. | |
| 5,668,243 A | 9/1997 | Yau et al. | |
| 5,674,928 A * | 10/1997 | Chisholm et al. ........... 524/147 |
| 5,681,918 A | 10/1997 | Adams et al. | |
| 5,696,176 A | 12/1997 | Khemani et al. | |
| 5,907,026 A | 5/1999 | Factor et al. | |
| 6,022,941 A | 2/2000 | Mestanza et al. | |
| 6,043,322 A | 3/2000 | Scott et al. | |
| 6,160,082 A | 12/2000 | Lin et al. | |
| 6,225,436 B1 | 5/2001 | Eiffler et al. | |
| 6,323,304 B1 | 11/2001 | Lemmon et al. | |
| 6,448,334 B1 | 9/2002 | Verhoogt et al. | |
| 6,504,002 B1 | 1/2003 | Karlik et al. | |
| 2002/0082360 A1* | 6/2002 | Conn et al. .................. 525/439 |

FOREIGN PATENT DOCUMENTS

| | | | |
|---|---|---|---|
| DE | 197 27 709 A1 | | 6/1997 |
| JP | 09-059371 | | 4/1997 |
| WO | WO 98/17725 | * | 4/1998 |
| WO | WO 2004/069931 A1 | | 8/2004 |

OTHER PUBLICATIONS

Chembridge.net Antioxidant product brochure.*
Coleman et al., "*Polymer Reviews—A Practical Guide to Polymer Miscibility*", Polymer, 1990, pp. 1187-1203, vol. 31, Butterworth-Heinemann Ltd.
Sears, J. Kern and Darby, Joseph R., "*The Technology of Plasticizers*", Society of Plastic Engineers, 1982, pp. 133-141, John Wiley and Sons, New York.
Chella, R., *Laminar Mixing of Miscible Fluids*, Mixing and Compounding Polymers, (1994), pp. 2-25, Ch. 1, Carl Hanser Verlag Publishers, New York.
Agassant, J. F. and Poitou, A., *A Kinematic Approach to Distributive Mixing*, Mixing and Compounding Polymers, (1994), pp. 28-54, Ch. 2, Carl Hanser Verlag Publishers, New York.
Manas-Zloczower, ICA, *Dispersive Mixing of Solid Additives*, Mixing and Compounding Polymers, (1994), pp. 56-83, Ch. 3, Carl Hanser Verlag Publishers, New York.
Meijer, Han E. H. and Janssen, Jos M. H., *Mixing of Immiscible Liquids*, Mixing and Compounding Polymers, (1994), pp. 86-147, Ch. 4, Carl Hanser Verlag Publishers, New York.
Tadmor, Z., *Number of Passage Distribution Functions*, Mixing and Compounding Polymers, (1994), pp. 150-161, Ch. 5, Carl Hanser Verlag Publishers, New York.

(Continued)

*Primary Examiner*—David J. Buttner
(74) *Attorney, Agent, or Firm*—B. J. Boshears; Bernard J. Graves, Jr.

(57) ABSTRACT

Disclosed are polymer blends comprising polycarbonate(s) and polyester(s) wherein the polycarbonate is a polycarbonate derived from bisphenol A and the polyester comprises residues of or is derived from one or more aromatic dicarboxylic acids, neopentyl glycol, and 1,4-cyclohexanedimethanol.

69 Claims, No Drawings

OTHER PUBLICATIONS

Inoue, Kimio, *Internal Batch Mixers*, Mixing and Compounding Polymers, (1994), pp. 620-647, Ch. 18, Carl Hanser Verlag Publishers, New York.

Hensen, F., Imping, W., and Spanknebel, F., *Single-Screw Extruders*, Mixing and Compounding Polymers, (1994), pp. 650-678, Ch. 19, Carl Hanser Verlag Publishers, New York.

Andersen, Paul G., *Mixing Practices in Corotating Twin-Screw Extruders*, Mixing and Compounding Polymers, (1994), pp. 680-705, Ch. 20, Carl Hanser Verlag Publishers, New York.

Sakai, Tadamoto, *Intermeshing Twin-Screw Extruders*, Mixing and Compounding Polymers, (1994), pp. 708-733, Ch. 21, Carl Hanser Verlag Publishers, New York.

Rauwendaal, Chris, *Mixing in Reciprocating Extruders*, Mixing and Compounding Polymers, (1994), pp. 736-759, Ch. 22, Carl Hanser Verlag Publishers, New York.

Canedo, Eduardo L. and Valsamis, Lefteris N., *Mixing in the Farrel Continuous Mixer*, Mixing and Compounding Polymers, (1994), pp. 762-830, Ch. 23, Carl Hanser Verlag Publishers, New York.

* cited by examiner

NEOPENTYL GLYCOL CONTAINING POLYESTERS BLENDED WITH POLYCARBONATES

FIELD OF THE INVENTION

The present invention relates to polymer blends comprising at least one polycarbonate and at least one polyester. More particularly, the present invention relates to polymer blends comprising polycarbonate(s) derived from bisphenol A and a polyester(s) derived from aromatic dicarboxylic acid(s), neopentyl glycol, and 1,4-cyclohexanedimethanol.

BACKGROUND OF INVENTION

The polycarbonate of 4,4'-isopropylidenediphenol (bisphenol A polycarbonate) is a well known engineering molding plastic. Bisphenol A polycarbonate is a clear, high-performance plastic having good physical properties such as dimensional stability, high heat resistance, and good impact strength. Although bisphenol-A polycarbonate has many good physical properties, its relatively high melt viscosity leads to poor melt processability and the polycarbonate exhibits poor chemical resistance.

Blends of polymers display different physical properties based upon the nature of the polymers blended together as well as the concentration of each polymer in the blend. Attempts have been made to blend bisphenol-A polycarbonate with other polymers that have good chemical resistance, processability, and machinability. These attempts to improve melt processability, chemical resistance and other physical properties of bisphenol-A polycarbonate have been made by blending bisphenol A polycarbonate with polymers such as polystyrene, elastomers, polyesters, and polyesterimides. However, blends of bisphenol-A polycarbonate with other polymeric materials usually have resulted in immiscible blend compositions. Immiscible blend compositions are inadequate for many uses because they are not clear.

Clear, miscible blends of any two polymers are rare. The term "miscible" refers to blends that are a mixture on a molecular level wherein intimate polymer-polymer interaction is achieved. Miscible blends are clear, not translucent or opaque. In addition, differential scanning calorimetry testing detects only a single glass transition temperature (Tg) for miscible blends composed of two or more components.

There have been very few clear polycarbonate/polyester blends developed U.S. Pat. No. 6,043,322 discloses clear blends of bisphenol-A polycarbonate and polyesters of terephthalic acid, isophthalic acid, ethylene glycol, and 2,2,4,4-tetramethyl-1,3-cyclobutanediol. U.S. Pat. Nos. 4,619,976 and 4,645,802 disclose clear blends based on bisphenol A polycarbonate with polyesters of poly(1,4-tetramethylene terephthalate), poly(1,4-cyclohexylenedimethylene terephthalate) and selected copolyesters and copoly(esterimides) of poly(1,4-cyclohexylenedimethylene terephthalate). U.S. Pat. No. 4,786,692 discloses clear blends of bisphenol-A polycarbonate and polyesters of terephthalic acid, isophthalic acid, ethylene glycol, and 1,4-cyclohexanedimethanol. U.S. Pat. Nos. 4,188,314 and 4,391,954 disclose clear blends of bisphenol A polycarbonate with poly(1,4-cyclohexylenedimethylene terephthalate-co-isophthalate). These polyester blends exhibit improved chemical resistance and melt processability, when compared to unblended bisphenol-A polycarbonate. Such blends are especially suitable for the manufacture of clear molded articles, fibers, sheeting, and film.

SUMMARY OF THE INVENTION

We have discovered that certain blends of certain polycarbonates and polyesters exhibit at least one improved property, and preferably, at least two improved properties in combination such as clarity and miscibility as well as heat deflection temperature, notched and unnotched Izod impact strength, flexural modulus, flexural strength and tensile strength. The polymer blend provided by the present invention comprises:

(A) about 1 to 99 percent by weight of at least one polycarbonate (A) comprising:
  (1) a diol component comprising about 90 to 100 mole percent 4,4'-isopropylidenediphenol residues, and
  (2) 0 to about 10 mole percent modifying diol residues; wherein the total mole percent of diol residues is equal to 100 mole percent; and
(B) about 99 to 1 percent by weight of at least one polyester (B) comprising
  (1) diacid residues comprising about 70 to 100 mole percent dicarboxylic acid units selected from the group consisting of terephthalic acid residues, isophthalic acid residues, or mixtures thereof; and 0 to about 30 mole percent of modifying dicarboxylic acid residues, wherein the total mole percent of diacid residues is equal to 100 mole percent; and
  (2) diol residues comprising about 40 to 99.9 mole percent 1,4-cyclohexanedimethanol residues, 0.1 to about 60 mole percent neopentyl glycol residues, and 0 to about 10 mole percent modifying diol residues having 3 to 16 carbons, wherein the total mole percent of diol residues is equal to 100 mole percent; and
wherein the total weight percent of said polycarbonate (A) and polyester (B) is equal to 100 weight percent.

Another embodiment of the present invention relates to a polymer blend comprising:

(A) about 0.1 to 75 percent, preferably 0.1 to 50, percent by weight of at least one polycarbonate (A) comprising:
  (1) a diol component comprising about 90 to 100 mole percent 4,4'-isopropylidenediphenol residues, and
  (2) 0 to about 10 mole percent modifying diol residues; wherein the total mole percent of diol residues is equal to 100 mole percent; and
(B) about 99.9 to 25 percent, preferably 99.9 to 50 percent by weight of at least one polyester (B) comprising
  (1) diacid residues comprising about 70 to 100 mole percent, preferably about 80 to 100 mole percent, of terephthalic acid residues; and 0 to about 30 mole percent of modifying dicarboxylic acid residues having about 2 to 20 carbons, wherein the total mole percent of diacid residues is equal to 100 mole percent; and
  (2) diol residues comprising about 50 to 80 mole percent 1,4-cyclohexanedimethanol residues, 20 to about 50 mole percent neopentyl glycol residues, and 0 to about 10 mole percent modifying diol residues, wherein the total mole percent of diol residues is equal to 100 mole percent; and
wherein the total weight percent of said polycarbonate (A) and polyester (B) is equal to 100 weight percent.

An additional embodiment of the present invention relates to a polymer blend comprising:

(A) about 1 to 99 percent by weight of at least one polycarbonate (A) comprising:
  (1) a diol component comprising about 90 to 100 mole percent 4,4'-isopropylidenediphenol residues, and (2) 0 to about 10 mole percent modifying diol residues; wherein the total mole percent of diol residues is equal to 100 mole percent; and (B) about 99 to 1 percent by weight of at least one polyester (B) comprising
  (1) diacid residues comprising about 80 to 100 mole percent of terephthalic acid residues; 0 to 20 mole percent isophthalic acid, and 0 to about 30 mole percent modifying dicarboxylic acid residues having about 2 to 20 carbons, wherein the total mole percent of diacid residues is equal to 100 mole percent; and
  (2) diol residues comprising about 50 to 80 mole percent 1,4-cyclohexanedimethanol residues, 20 to about 50 mole percent neopentyl glycol residues, and 0 to about 10 mole percent modifying diol residues having 3 to 16 carbons, wherein the total mole percent of diol residues is equal to 100 mole percent; and wherein the total weight percent of said polycarbonate (A) and polyester (B) is equal to 100 weight percent.

Yet another embodiment of the present invention relates to a method for producing the polymer blend of the present invention comprising the steps of: (a) blending said polycarbonate (A) and said polyester (B); (b) before, during or after the blending, melting polycarbonate (A) and polyester (B) to form after the blending and melting, a melt blend; and (c) cooling the melt blend to form a polymer blend composition.

The invention also includes molded or formed articles, film, sheet, and/or fibers comprising the polymer blends of the invention which may be formed by any conventional method known in the art as well as a process for making such articles, film, sheet, and/or fibers comprising the steps of injection molding, extrusion blow molding, film/sheet extruding or calendering the polymer blend(s).

DETAILED DESCRIPTION OF THE INVENTION

This invention encompasses polymer blends involving polycarbonates and polyesters which comprise 1,4-cyclohexanedimethanol and neopentyl glycol.

Surprisingly, the present invention provides polymer blends exhibit an improved combination of at least two properties such as clarity and miscibility as well as heat deflection temperatures, notched and unnoticed Izod impact strength, flexural modulus, flexural strength and tensile strength.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present invention. At the very least, each numerical parameter should at least be construed in light of the number of reported significant digits and by applying ordinary rounding techniques. Further, the ranges stated in this disclosure and the claims are intended to include the entire range specifically and not just the endpoint(s). For example, a range stated to be 0 to 10 is intended to disclose all whole numbers between 0 and 10 such as, for example 1, 2, 3, 4, etc., all fractional numbers between 0 and 10, for example 1.5, 2.3, 4.57, 6.1113, etc., and the endpoints 0 and 10. Also, a range associated with chemical substituent groups such as, for example, "$C_1$ to $C_5$ hydrocarbons", is intended to specifically include and disclose $C_1$ and $C_5$ hydrocarbons as well as $C_2$, $C_3$, and $C_4$ hydrocarbons.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The term "polyester", as used herein, is intended to include "copolyesters" and is understood to mean a synthetic polymer prepared by the polycondensation of one or more difunctional carboxylic acids with one or more difunctional hydroxyl compounds. Typically the difunctional carboxylic acid is a dicarboxylic acid and the difunctional hydroxyl compound is a dihydric alcohol such as, for example, glycols and diols. The term "residue", as used herein, means any organic structure incorporated into a polymer or plasticizer through a polycondensation reaction involving the corresponding monomer. The term "repeating unit", as used herein, means an organic structure having a dicarboxylic acid residue and a diol residue bonded through a carbonyloxy group. Thus, the dicarboxylic acid residues may be derived from a dicarboxylic acid monomer or its associated acid halides, esters, salts, anhydrides, or mixtures thereof. As used herein, therefore, the term dicarboxylic acid is intended to include dicarboxylic acids and any derivative of a dicarboxylic acid, including its associated acid halides, esters, half-esters, salts, half-salts, anhydrides, mixed anhydrides, or mixtures thereof, useful in a polycondensation process with a diol to make a high molecular weight polyester.

The polymer blends of present invention include at least one polyester(s) (B) comprising dicarboxylic acid residues, diol residues, and, optionally, branching monomer residues. The polyester(s) (B) included in the present invention contain substantially equal molar proportions of acid residues (100 mole %) and diol residues (100 mole %) which react in substantially equal proportions such that the total moles of repeating units is equal to 100 mole %. The mole percentages provided in the present disclosure, therefore, may be based on the total moles of acid residues, the total moles of diol residues, or the total moles of repeating units. For example, a polyester containing 20 mole % isophthalic acid, based on the total acid residues, means the polyester contains 20 mole % isophthalic acid residues out of a total of 100 mole % acid residues. Thus, there are 20 moles of isophthalic acid residues among every 100 moles of acid residues. In another example, a polyester containing 10 mole % ethylene glycol, based on the total diol residues, means the polyester contains 10 mole % ethylene glycol residues out of a total of 100 mole % diol residues. Thus, there are 10 moles of ethylene glycol residues among every 100 moles of diol residues.

The polymer blends of the invention comprise polyester(s) (B) and polycarbonates (A) that are miscible and which typically exhibit only a glass transition temperature (abbreviated herein as "Tg") as a blend, as measured by well-known techniques such as, for example, differential scanning calorimetry ("DSC"). The desired crystallization kinetics from the melt also may be achieved by the addition of polymeric additives such as, for example, plasticizers, or by altering the molecular weight characteristics of the polymer. The polyesters utilized in the present invention are amorphous or semi-crystalline and have glass transition temperatures of about 40 to 140° C., preferably about 60 to 100° C. The polyesters typically have an inherent viscosity (I.V.) of about 0.3 to 1.2 dL/g, preferably about 0.6 to 1.1 dL/g. As used herein, I.V. refers to inherent viscosity determinations made at 25° C. using 0.50 gram of polymer per 100 mL of a solvent composed of 60 weight percent phenol and 40 weight percent tetrachloroethane. The basic method of determining the I.V. of the polyesters herein is set forth in ASTM method D2857-95.

The diacids useful in the present invention may comprise from about 70 to 100 mole percent, preferably 80 to 100 mole percent, more preferably, 85 to 100 mole percent, even more preferably, 90 to 100 mole percent, and further 95 to 100 mole percent, of dicarboxylic acids selected from the group consisting of terephthalic acid residues, isophthalic acids, or mixtures thereof. For example, the polyester may comprise about 70 to about 100 mole % of diacid residues from terephthalic acid and 0 to about 30 mole % diacid residues from isophthalic acid (in one embodiment, about 0.1 to 30 mole percent isophthalic acid.

Polyester (B) of the polymer blends of the invention also may further comprise from about 0 to about 30 mole percent, preferably 0 to 10 mole percent, and more preferably, 0.1 to 10 mole percent of the residues of one or more modifying diacids (not terephthalic acid and/or isophthalic acid). Examples of modifying diacids containing that may be used include but are not limited to aliphatic dicarboxylic acids, alicyclic dicarboxylic acids, aromatic dicarboxylc acids, or mixtures of two or more of these acids. Specific examples of modifying dicarboxylic acids include, but are not limited to, one or more of succinic acid, glutaric acid, adipic acid, suberic acid, sebacic acid, azelaic acid, dimer acid, sulfoisophthalic acid. Additional examples of modifying diacids are fumaric, maleic, itaconic, 1,3-cyclohexanedicarboxylic, diglycolic, 2,5-norbornanedicarboxyclic, phthalic acid, diphenic, 4,4'-oxydibenzoic, and 4,4'-sulfonyldibenzoic. Other examples of modifying dicarboxylic acid residues include but are not limited to naphthalenedicarboxylic acid and 1,4-cyclohexanedicarboxylic acid. Any of the various isomers of naphthalenedicarboxylic acid or mixtures of isomers may be used, but the 1,4-, 1,5-, 2,6-, and 2,7-isomers are preferred. Cycloaliphatic dicarboxylic acids such as, for example, 1,4-cyclohexanedicarboxylic acid may be present at the pure cis or trans isomer or as a mixture of cis and trans isomers. Dicarboxylic acids having 2 to 20 carbon atoms, preferably 2 to 18 carbon atoms, and more preferably, 2 to 16 carbon atoms, are included in one embodiment of the invention.

The polyester (B) also comprises diol residues that may comprise about 45 to about 95 mole percent of the residues of 1,4-cyclohexanedimethanol, 55 to about 5 mole percent of the residues of neopentyl glycol, and 0 to 10 mole percent of one or more modifying diol residues. As used herein, the term "diol" is synonymous with the term "glycol" and means any dihydric alcohol. In one embodiment, the modifying diols have from 2 to 20 carbon atoms, preferably from 2 to 18 carbon atoms, and more preferably, 2 to 16 carbon atoms. For example, in polyester (B), the diol residues may comprise about: (a) 45 to 95 mole percent, preferably, about 50 to 80 mole percent, more preferably, about 55 to 75 mole percent, even more preferably, about 55 to 70 mole percent, and about 58 to 68 mole percent of the residues of 1,4-cyclohexanedimethanol, based on the total mole percentage of diol residues equaling 100 mole percent, (b) 55 to 5 mole percent, preferably, about 50 to 20 mole percent, more preferably, about 45 to 30 mole percent, and even more preferably, about 42 to 32 mole percent of the residues of neopentyl glycol, based on the total mole percentage of diol residues equaling 100 mole percent, and (c) about 0 to 10 mole percent, preferably, about 0 to 5 mole percent, also, preferably, 0.1 to 10 mole percent, and even more preferably, about 0.1 to about 5 mole percent of the residues of one or more modifying diols for polyester (B) which are selected from one or more of ethylene glycol, 1,2-propanediol, 1,3-propanediol, 1,4-butanediol, 1,5-pentanediol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, or polyalkylene glycol. Further examples of modifying diols that may be used in the polyesters of our invention are triethylene glycol; polyethylene glycols; 2,4-dimethyl-2-ethylhexane-1,3-diol; 2,2-dimethyl-1,3-propanediol; 2-ethyl-2-butyl-1,3-propanediol; 2-ethyl-2-isobutyl-1,3-propanediol; 1,3-butanediol; thiodiethanol; 1,2-cyclohexanedimethanol; p-xylylenediol; bisphenol S; or combinations of one or more of any of these modifying glycols. The cycloaliphatic diols, for example, 1,3- and 1,4-cyclohexanedimethanol, may be present as their pure cis or trans isomers or as a mixture of cis and trans isomers. In another example, the diol residues may comprise from about 45 to about 95 mole percent of the residues of 1,4-cyclohexanedimethanol, about 55 to 5 mole percent of the residues of neopentyl glycol, and from about 0 to 10 mole percent of the residues of ethylene glycol. In a further example, the diol residues may comprise from about 50 to about 80 mole percent of the residues of 1,4-cyclohexanedimethanol, from about 50 to about 20 mole percent of the residues of neopentyl glycol, and from about 0 to about 10 mole percent of the residues of ethylene glycol. In another example, the diol residues may comprise from about 55 to 70 mole percent of the residues of 1,4-cyclohexanedimethanol, from about 45 to 30 mole percent of the residues of neopentyl glycol, and about 0 to 10 mole percent of the residues of modifying diol residues, preferably, 0.1 to 10 mole percent of the residues of modifying diol residues, for example, ethylene glycol. In yet another example, the diol residues may comprise from about 58 to about 68 mole percent of the residues of 1,4-cyclohexanedimethanol, and from about 42 to about 32 mole percent of the residues of neopentyl glycol.

In connection with any of the described ranges for mole percentages of the diol residues present herein, any of the described mole percentages of the diacid residues. may be used In general. In combination with the preferred ranges for the mole percentages of the diol residues stated herein, it is another embodiment of the invention that the diacid residues of polyester (B) comprise about 80 to about 100 mole percent of the residues of terephthalic acid. While modifying diols are contemplated within the scope of this invention, residues of 1,4-cyclohexanedimethanol and neopentyl glycol are also envisioned within the scope of this invention as the only diol residues comprised in polyester (B). In a preferred embodiment, 1,4-cyclohexanedimethanol and neopentyl glycol are the only diol residues present in polyester (B), and the diacid residues comprise about 80 to about 100 mole percent of the residues of terephthalic acid.

The diacid and diol residues of one of the embodiments of the polyesters included in the polymer blends of the invention consist essentially of:

(1) diacid residues comprising at least 70 mole percent, preferably about 80 to 100 mole percent, of terephthalic acid residues and 0 to about 30 mole percent isophthalic acid residues; and (2) diol residues comprising about 40 to 99 mole percent, preferably about 50 to 80 mole percent, 1,4-cyclohexanedimethanol residues and about 0.1 to 60 mole percent, preferably about 20 to 50 mole percent, neopentyl glycol residues.

The polymer blends of the invention typically comprise from about 1 to 99 weight percent, preferably 0.1 to 75 weight percent, more preferably, 0.1 to 50 weight percent, preferably 10 to 30 weight percent, preferably 15 to 30 weight percent, of at least one polycarbonate (A) comprising: (1) a diol component comprising about 90 to 100 mole percent 4,4'-isopropylidenediphenol residues; and (2) about 0 to 10 mole percent modifying diol residues; wherein the total mole percent of the diol residues is equal to 100 mole percent; and comprise from about 99 to 1 weight percent, preferably 99.9 to 25 weight percent, more preferably, 0.99.9 to 50 weight percent, and even more preferably, 75 to 50 weight percent of at least one polyester (B), wherein the total weight percent of polycarbonate (A) and polyester (B) is equal to 100 weight percent.

Polyester (B) comprises from about 0.01 to about 10 weight percent (wt %), preferably, from about 0.05 to about 5 weight percent, more preferably, from about 0.01 to 1 weight percent, and even more preferably, 0.1 to 0.7 weight percent, based on the total weight of the polyester, of one or more residues of a branching monomer having 3 or more carboxyl substituents, hydroxyl substituents, or a combination thereof. Examples of branching monomers include, but are not limited to, multifunctional acids or glycols such as trimellitic acid, trimellitic anhydride, pyromellitic dianhydride, trimethylolpropane, glycerol, pentaerythritol, citric acid, tartaric acid, 3-hydroxyglutaric acid and the like. Preferably, the branching monomer residues comprise about 0.1 to about 0.7 mole percent of one or more residues of: trimellitic anhydride, pyromellitic dianhydride, glycerol, sorbitol, 1,2,6-hexanetriol, pentaerythritol, trimethylolethane, or trimesic acid. The branching monomer may be added to the polyester reaction mixture or blended with the polyester in the form of a concentrate as described, for example, in U.S. Pat. Nos. 5,654,347 and 5,696,176.

The 1,4-cyclohexanedimethanol residues typically have a trans isomer content in the range of about 60 to 100%. However, a preferred isomer content is in the range of about 60 to about 80% trans isomer.

The polyesters are readily prepared by conventional methods well known in the art. For example, melt phase or a combination of melt phase and solid phase polycondensation techniques may be used if desired. The diacid residues of the polyesters may be derived from the dicarboxylic acid or a derivative of the diacid such as the lower alkyl esters, e.g., dimethyl terephthalate, acid halides, e.g., diacid chlorides, or, in some cases, anhydrides.

The polyesters present in the instant invention are readily prepared from the appropriate dicarboxylic acids, esters, anhydrides, or salts, the appropriate diol or diol mixtures, and branching monomers using typical polycondensation reaction conditions. They may be made by continuous, semi-continuous, and batch modes of operation and may utilize a variety of reactor types. Examples of suitable reactor types include, but are not limited to, stirred tank, continuous stirred tank, slurry, tubular, wiped-film, falling film, or extrusion reactors. The term "continuous" as used herein means a process wherein reactants are introduced and products withdrawn simultaneously in an uninterrupted manner. By "continuous" it is meant that the process is substantially or completely continuous in operation in contrast to a "batch" process. "Continuous" is not meant in any way to prohibit normal interruptions in the continuity of the process due to, for example, start-up, reactor maintenance, or scheduled shut down periods. The term "batch" process as used herein means a process wherein all the reactants are added to the reactor and then processed according to a predetermined course of reaction during which no material is fed or removed into the reactor. The term "semicontinuous" means a process where some of the reactants are charged at the beginning of the process and the remaining reactants are fed continuously as the reaction progresses. Alternatively, a semicontinuous process may also include a process similar to a batch process in which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

The polyesters included in the present invention are prepared by procedures known to persons skilled in the art. The reaction of the diol, dicarboxylic acid, and branching monomer components may be carried out using conventional polyester polymerization conditions. For example, when preparing the polyester by means of an ester interchange reaction, i.e., from the ester form of the dicarboxylic acid components, the reaction process may comprise two steps. In the first step, the diol component and the dicarboxylic acid component, such as, for example, dimethyl terephthalate, are reacted at elevated temperatures, typically, about 150° C. to about 250° C. for about 0.5 to about 8 hours at pressures ranging from about 0.0 kPa gauge to about 414 kPa gauge (60 pounds per square inch, "psig"). Preferably, the temperature for the ester interchange reaction ranges from about 180° C. to about 230° C. for about 1 to about 4 hours while the preferred pressure ranges from about 103 kPa gauge (15 psig) to about 276 kPa gauge (40 psig). Thereafter, the reaction product is heated under higher temperatures and under reduced pressure to form the polyester with the elimination of diol, which is readily volatilized under these conditions and removed from the system. This second step, or polycondensation step, is continued under higher vacuum and a temperature which generally ranges from about 230° C. to about 350° C., preferably about 250° C. to about 310° C. and, most preferably, about 260° C. to about 290° C. for about 0.1 to about 6 hours, or preferably, for about 0.2 to about 2 hours, until a polymer having the desired degree of polymerization, as determined by inherent viscosity, is obtained. The polycondensation step may be conducted under reduced pressure which ranges from about 53 kPa (400 torr) to about 0.013 kPa (0.1 torr). Stirring or appropriate conditions are used in both stages to ensure adequate heat transfer and surface renewal of the reaction mixture. The reaction rates of both stages are increased by appropriate catalysts such as, for example, alkoxy titanium compounds, alkali metal hydroxides and alcoholates, salts of organic carboxylic acids, alkyl tin compounds, metal oxides, and the like. A three-stage manufacturing procedure, similar to that described in U.S. Pat. No. 5,290,631, may also be used, particularly when a mixed monomer feed of acids and esters is employed.

To ensure that the reaction of the diol component and dicarboxylic acid component by an ester interchange reaction is driven to completion, it is sometimes desirable to employ about 1.05 to about 2.5 moles of diol component to one mole dicarboxylic acid component. Persons of skill in the art will understand, however, that the ratio of diol component to dicarboxylic acid component is generally determined by the design of the reactor in which the reaction process occurs.

In the preparation of polyester by direct esterification, i.e., from the acid form of the dicarboxylic acid component, polyesters are produced by reacting the dicarboxylic acid or a mixture of dicarboxylic acids with the diol component or a mixture of diol components and the branching monomer component. The reaction is conducted at a pressure of from about 7 kPa gauge (1 psig) to about 1379 kPa gauge (200 psig), preferably less than 689 kPa (100 psig) to produce a low molecular weight polyester product having an average degree of polymerization of from about 1.4 to about 10. The temperatures employed during the direct esterification reaction typically range from about 180° C. to about 280° C., more preferably ranging from about 220° C. to about 270° C. This low molecular weight polymer may then be polymerized by a polycondensation reaction. Examples of the catalyst materials that may be used in the synthesis of the polyesters utilized in the present invention include titanium, manganese, zinc, cobalt, antimony, gallium, lithium, calcium, silicon and germanium. Such catalyst systems are described in U.S. Pat. Nos. 3,907,754, 3,962,189, 4,010,145, 4,356,299, 5,017,680, 5,668,243 and 5,681,918, herein incorporated by reference in their entirety. Preferred catalyst metals include titanium and manganese and most preferred is titanium. The amount of catalytic metal used may range from about 5 to 100 ppm but the use of catalyst concentrations of about 5 to about 35 ppm titanium is preferred in order to provide polyesters having good color, thermal stability and electrical properties. Phosphorus compounds frequently are used in combination with the catalyst metals and any of the phosphorus compounds normally used in making polyesters may be used. Up to about 100 ppm phosphorus typically may be used.

The polycarbonates that may be utilized in the present invention are derived from bisphenol A and may be prepared according to procedures well known in the art, e.g. the procedures described in U.S. Pat. Nos. 3,030,335 and 3,317,466. Examples of suitable bisphenol A polycarbonates include the materials marketed under the tradenames LEXAN, available from the General Electric Company, and MAKROLON 2608, available from Bayer, Inc.

The polycarbonate portion of the present blend preferably has a diol component containing about 90 to 100 mole percent bisphenol A units, and 0 to about 10 mole percent can be substituted with units of other modifying aliphatic or aromatic diols, besides bisphenol A, having from 2 to 16 carbons. The polycarbonate can contain branching agents, such as tetraphenolic compounds, tri-(4-hydroxyphenyl) ethane, pentaerythritol triacrylate and others discussed in U.S. Pat. Nos. 6,160,082; 6,022,941; 5,262,51; 4,474,999; and 4,286,083. Other suitable branching agents are mentioned herein below. It is preferable to have at least 95 mole percent of diol units in the polycarbonate being bisphenol A. Suitable examples of modifying aromatic diols include the aromatic diols disclosed in U.S. Pat. Nos. 3,030,335 and 3,317,466.

The inherent viscosity of the polycarbonate portion of the blends according to the present invention is preferably at least about 0.3 dL/g, more preferably at least 0.5 dL/g, determined at 25° C. in 60/40 wt/wt phenol/tetrachloroethane.

The melt flow of the polycarbonate portion of the blends according to the present invention is preferably between 1 and 20, and more preferably between 2 and 18, as measured according to ASTM D1238 at a temperature of 300° C. and using a weight of 1.2 kg.

The polycarbonate portion of the present blend can be prepared in the melt, in solution, or by interfacial polymerization techniques well known in the art. Suitable methods include the steps of reacting a carbonate source with a diol at a temperature of about 0° C. to 315° C. at a pressure of about 0.1 to 760 mm Hg for a time sufficient to form a polycarbonate. Commercially available polycarbonates that can be used in the present invention, are normally made by reacting an aromatic diol with a carbonate source such as phosgene, dibutyl carbonate, or diphenyl carbonate, to incorporate 100 mol percent of carbonate units, along with 100 mol percent diol units into the polycarbonate. For examples of methods of producing polycarbonates, see U.S. Pat. Nos. 5,498,688; 5,494,992; and 5,489,665, which are incorporated by reference in their entirety.

Processes for preparing polycarbonates are known in the art. The linear or branched polycarbonate that can be used in the invention disclosed herein is not limited to or bound by the polycarbonate type or its production method. Generally, a dihydric phenol, such as bisphenol A, is reacted with phosgene with the use of optional mono-functional compounds as chain terminators and tri-functional or higher functional compounds as branching or crosslinking agents. Reactive acyl halides are also condensation polymerizable and have been used in polycarbonates as terminating compounds (mono-functional), comonomers (di-functional), or branching agents (tri-functional or higher).

One method of forming branched polycarbonates, disclosed, for example, in U.S. Pat. No. 4,001,884, involves the incorporation of an aromatic polycarboxylic acid or functional derivative thereof in a conventional polycarbonate-forming reaction mixture. The examples in the '884 patent demonstrate such incorporation in a reaction in which phosgene undergoes reaction with a bisphenol, under alkaline conditions typically involving a pH above 10. Experience has shown that a preferred aromatic polycarboxylic acid derivative is trimellitic acid trichloride. Also disclosed in the aforementioned patent is the employment of a monohydric phenol as a molecular weight regulator; it functions as a chain termination agent by reacting with chloroformate groups on the forming polycarbonate chain.

U.S. Pat. No. 4,367,186 disclose a process for producing cross-linked polycarbonates wherein a cross-linkable polycarbonate contains methacrylic acid chloride as a chain terminator. A mixture of bisphenol A, aqueous sodium hydroxide, and methylene chloride is prepared. To this is added a solution of methacrylic acid chloride in methylene chloride. Then, phosgene is added, and an additional amount of aqueous sodium hydroxide is added to keep the pH between 13 and 14. Finally, the triethylamine coupling catalyst is added.

EP 273 144 discloses a branched poly(ester)carbonate which is end capped with a reactive structure of the formula —C(O)—CH═CH—R, wherein R is hydrogen or C1-3 alkyl. This polycarbonate is prepared in a conventional manner using a branching agent, such as trimellityl trichloride and an acryloyl chloride to provide the reactive end groups. According to the examples, the process is carried out by mixing water, methylene chloride, triethylamine, bisphenol A, and optionally para-t-butyl phenol as a chain terminating agent. The pH is maintained at 9 to 10 by addition of aqueous sodium hydroxide. A mixture of terephthaloyl dichloride, isophthaloyl dichloride, methylene chloride, and optionally acryloyl chloride, and trimellityl trichloride is added dropwise. Phosgene is then introduced slowly into the reaction mixture.

Randomly branched polycarbonates and methods of preparing them are known from U.S. Pat. No. 4,001,184. At least 20 weight percent of a stoichiometric quantity of a carbonate precursor, such as an acyl halide or a haloformate, is reacted with a mixture of a dihydric phenol and at least 0.05 mole percent of a polyfunctional aromatic compound in a medium of water and a solvent for the polycarbonate. The medium contains at least 1.2 mole percent of a polymerization catalyst. Sufficient alkali metal hydroxide is added to the reaction medium to maintain a pH range of 3 to 6, and then sufficient alkali metal hydroxide is added to raise the pH to at least 9 but less than 12 while reacting the remaining carbonate precursor.

U.S. Pat. No. 6,225,436 discloses a process for preparing polycarbonates which allows the condensation reaction incorporation of an acyl halide compound into the polycarbonate in a manner which is suitable in batch processes and in continuous processes. Such acyl halide compounds can be mono-, di-, tri- or higher-functional and are preferably for branching or terminating the polymer molecules or providing other functional moieties at terminal or pendant locations in the polymer molecule.

U.S. Pat. No. 5,142,088 discloses the preparation of branched polycarbonates, and more particularly to novel intermediates useful in the preparation and a method for conversion of the intermediates via chloroformate oligomers to the branched polycarbonates. One method for making branched polycarbonates with high melt strength is a variation of the melt-polycondensation process where the diphenyl carbonate and Bisphenol A are polymerized together with polyfunctional alcohols or phenols as branching agents.

DE 19727709 discloses a process to make branched polycarbonate in the melt-polymerization process using aliphatic alcohols. It is known that alkali metal compounds and alkaline earth compounds, when used as catalysts added to the monomer stage of the melt process, will not only generate the desired polycarbonate compound, but also other products after a rearrangement reaction known as the "Fries" rearrangement. This is discussed in U.S. Pat. No. 6,323,304. The presence of the Fries rearrangement products in a certain range can increase the melt strength of the polycarbonate resin to make it suitable for bottle and sheet applications. This method of making a polycarbonate resin with a high melt strength has the advantage of having lower raw material costs compared with the method of making a branched polycarbonate by adding "branching agents." In general, these catalysts are less expensive and much lower amounts are required compared to the branching agents.

JP 09059371 discloses a method for producing an aromatic polycarbonate in the presence of a polycondensation catalyst, without the use of a branching agent, which results in a polycarbonate possessing a branched structure in a specific proportion. In particular, JP 09059371 discloses the fusion-polycondensation reaction of a specific type of aromatic dihydroxy compound and diester carbonate in the presence of an alkali metal compound and/or alkaline earth metal compound and/or a nitrogen-containing basic compound to produce a polycarbonate having an intrinsic viscosity of at least 0.2. The polycarbonate is then subject to further reaction in a special self-cleaning style horizontal-type biaxial reactor having a specified range of the ratio L/D of 2 to 30 (where L is the length of the horizontal rotating axle and D is the rotational diameter of the stirring fan unit). JP 09059371 teaches the addition of the catalysts directly to the aromatic dihydroxy compound and diester carbonate monomers.

U.S. Pat. No. 6,504,002 discloses a method for production of a branched polycarbonate composition, having increased melt strength, by late addition of branch-inducing catalysts to the polycarbonate oligomer in a melt polycondensation process, the resulting branched polycarbonate composition, and various applications of the branched polycarbonate composition. The use of polyhydric phenols having three or more hydroxy groups per molecule, for example, 1,1,1-tris-(4-hydroxyphenyl)ethane (THPE), 1,3,5-tris-(4-hydroxyphenyl)benzene, 1,4-bis-[di-(4-hydroxyphenyl)phenylmethyl]benzene, and the like, as branching agents for high melt strength blow-moldable polycarbonate 30 resins prepared interfacially has been described in U.S. Pat. Nos. Re. 27,682 and 3,799,953.

Other methods known to prepare branched polycarbonates through heterogeneous interfacial polymerization methods include the use of cyanuric chloride as a branching agent (U.S. Pat. No. 3,541,059), branched dihydric phenols as branching agents (U.S. Pat. No. 4,469,861), and 3,3-bis-(4-hydroxyaryl)-oxindoles as branching agents (U.S. Pat. No. 4,185,009). Additionally, aromatic polycarbonates end-capped with branched alkyl acyl halides and/or acids and said to have improved properties are described in U.S. Pat. No. 4,431,793.

Trimellitic triacid chloride has also been used as a branching agent in the interfacial preparation of branched polycarbonate. U.S. Pat. No. 5,191,038 discloses branched polycarbonate compositions having improved melt strength and a method of preparing them from aromatic cyclic polycarbonate oligomers in a melt equilibration process.

The polymer blends of the present invention may include any various additives conventional in the art. For example, the polymer blend can include from about 0.01 to about 50 weight percent, based on the total weight of the composition, of at least one additional additive selected from a lubricant, a non-polymeric plasticizer, a thermal stabilizer, an antioxidant, a pro-oxidant, an acid scavenger, an ultraviolet light stabilizer, a promoter of photodegradation, an antistatic agent, a pigment, a dye, or a colorant. Typical non-polymeric plasticizers include dioctyl adipate, phosphates, and diethyl phthalate. Representative inorganics include, talc, $TiO_2$, $CaCO_3$, $NH_4CL$, and silica. Colorants can be monomeric, oligomeric, and polymeric. Preferred polymeric colorants are aliphatic polyesters, aliphatic-aromatic copolyesters, or aromatic polyesters in which the color producing monomer, i.e., a dye, is covalently incorporated into the polymer. Such representative polymeric colorants are described by Weaver et al. in U.S. Pat. Nos. 4,892,922, 4,892,923, 4,882,412, 4,845,188, 4,826,903 and 4,749,773 the entire disclosures of which are incorporated herein by reference.

Although not essential, the polymer blends of the invention may comprise a plasticizer. The presence of the plasticizer is useful to enhance flexibility and the good mechanical properties of the calendered film or sheet. The plasticizer also helps to lower the processing temperature of the polyesters. The plasticizers typically comprise one or more aromatic rings. The preferred plasticizers are soluble in the polyester as indicated by dissolving a 5-mil (0.127 mm) thick film of the polyester to produce a clear solution at a temperature of 160° C. or less. More preferably, the plasticizers are soluble in the polyester as indicated by dissolving a 5-mil (0.127 mm) thick film of the polyester to produce a clear solution at a temperature of 150° C. or less. The solubility of the plasticizer in the polyester may be determined as follows:

1. Placing into a small vial a ½ inch section of a standard reference film, 5 mils (0.127 mm) in thickness and about equal to the width of the vial.
2. Adding the plasticizer to the vial until the film is covered completely.
3. Placing the vial with the film and plasticizer on a shelf to observe after one hour and again at 4 hours. Note the appearance of the film and liquid.
4. After the ambient observation, placing the vial in a heating block and allow the temperature to remain constant at 75° C. for one hour and observe the appearance of the film and liquid.
5. Repeating step 4 for each of the following temperatures (° C.): 100, 140, 150, and 160.

Examples of plasticizers potentially useful in the invention are as follows:

TABLE 1

| Plasticizers |
|---|
| Adipic Acid Derivatives |
| Dicapryl adipate |
| Di-(2-ethylhexyl adipate) |
| Di(n-heptyl, n-nonyl) adipate |
| Diisobutyl adipate |
| Diisodecyl adipate |
| Dinonyl adipate |
| Di-(tridecyl) adipate |
| Azelaic Acid Derivatives |
| Di-(2-ethylhexyl azelate) |
| Diisodecyl azelate |
| Diisoctyl azealate |
| Dimethyl azelate |
| Di-n-hexyl azelate |
| Benzoic Acid Derivatives |
| Diethylene glycol dibenzoate (DEGDB) |
| Dipropylene glycol dibenzoate |
| Propylene glycol dibenzoate |
| Polyethylene glycol 200 dibenzoate |
| Neopentyl glycol dibenzoate |
| Citric Acid Derivatives |
| Acetyl tri-n-butyl citrate |
| Acetyl triethyl citrate |
| Tri-n-Butyl citrate |
| Triethyl citrate |
| Dimer Acid Derivatives |
| Bis-(2-hydroxyethyl dimerate) |
| Epoxy Derivatives |
| Epoxidized linseed oil |
| Epoxidized soy bean oil |
| 2-Ethylhexyl epoxytallate |
| Fumaric Acid Derivatives |
| Dibutyl fumarate |
| Glycerol Derivatives |
| Glycerol Tribenzoate |
| Glycerol triacetate |
| Glycerol diacetate monolaurate |
| Isobutyrate Derivative |
| 2,2,4-Trimethyl-1,3-pentanediol, Diisobutyrate |
| Texanol diisobutyrate |

TABLE 1-continued

| Plasticizers |
|---|
| Isophthalic Acid Derivatives |
| Dimethyl isophthalate |
| Diphenyl isophthalate |
| Di-n-butylphthalate |
| Lauric Acid Derivatives |
| Methyl laurate |
| Linoleic Acid Derivative |
| Methyl linoleate, 75% |
| Maleic Acid Derivatives |
| Di-(2-ethylhexyl) maleate |
| Di-n-butyl maleate |
| Mellitates |
| Tricapryl trimellitate |
| Triisodecyl trimellitate |
| Tri-(n-octyl, n-decyl) trimellitate |
| Triisonyl trimellitate |
| Myristic Acid Derivatives |
| Isopropyl myristate |
| Oleic Acid Derivatives |
| Butyl oleate |
| Glycerol monooleate |
| Glycerol trioleate |
| Methyl oleate |
| n-Propyl oleate |
| Tetrahydrofurfuryl oleate |
| Palmitic Acid Derivatives |
| Isopropyl palmitate |
| Methyl palmitate |
| Paraffin Derivatives |
| Chloroparaffin, 41% Cl |
| Chloroparaffin, 50% Cl |
| Chloroparaffin, 60% Cl |
| Chloroparaffin, 70% Cl |
| Phosphoric Acid Derivatives |
| 2-Ethylhexyl diphenyl phosphate |
| Isodecyl diphenyl phosphate |
| t-Butylphenyl diphenyl phosphate |
| Resorcinol bis(diphenyl phosphate) (RDP) |
|     100% RDP |
|     Blend of 75% RDP, 25% DEGDB (by wt) |
|     Blend of 50% RDP, 50% DEGDB (by wt) |
|     Blend of 25% RDP, 75% DEGDB (by wt) |
| Tri-butoxyethyl phosphate |
| Tributyl phosphate |
| Tricresyl phosphate |
| Triphenyl phosphate |
| Phthalic Acid Derivatives |
| Butyl benzyl phthalate |
| Texanol benzyl phthalate |
| Butyl octyl phthalate |
| Dicapryl phthalate |
| Dicyclohexyl phthalate |
| Di-(2-ethylhexyl) phthalate |
| Diethyl phthalate |
| Dihexyl phthalate |
| Diisobutyl phthalate |
| Diisodecyl phthalate |
| Diisoheptyl phthalate |
| Diisononyl phthalate |
| Diisooctyl phthalate |
| Dimethyl phthalate |
| Ditridecyl phthalate |
| Diundecyl phthalate |

TABLE 1-continued

Plasticizers

Ricinoleic Acid Derivatives

Butyl ricinoleate
Glycerol tri(acetyl) ricinlloeate
Methyl acetyl ricinlloeate
Methyl ricinlloeate
n-Butyl acetyl ricinlloeate
Propylene glycol ricinlloeate
Sebacic Acid Derivatives Dibutyl sebacate
Di-(2-ethylhexyl) sebacate
Dimethyl sebacate
Stearic Acid Derivatives Ethylene glycol monostearate
Glycerol monostearate
Isopropyl isostearate
Methyl stearate
n-Butyl stearate
Propylene glycol monostearate
Succinic Acid Derivatives Diethyl succinate
Sulfonic Acid Derivatives N-Ethyl o,p-toluenesulfonamide
o,p-toluenesulfonamide A similar test to that above is described in *The Technology of Plasticizers*, by J. Kern Sears and Joseph R. Darby, published by Society of Plastic Engineers/Wiley and Sons, New York, 1982, pp 136-137. In this test, a grain of the polymer is placed in a drop of plasticizer on a heated microscope stage. If the polymer disappears, then it is solubilized. The plasticizers can also be classified according to their solubility parameter. The solubility parameter, or square root of the cohesive energy density, of a plasticizer can be calculated by the method described by Coleman et al., *Polymer* 31, 1187 (1990). The most preferred plasticizers will have a solubility parameter ($\delta$) in the range of about 9.5 to about 13.0 $cal^{0.5}cm^{-1.5}$. It is generally understood that the solubility parameter of the plasticizer should be within 1.5 units of the solubility parameter of polyester. The plasticizers in Table 2 that are preferred in the context of this invention are as follows:

TABLE 2

Preferred Plasticizers

Glycerol diacetate monolaurate
Texanol diisobutyrate
Di-2-ethylhexyladipate
Trioctyltrimellitate
Di-2-ethylhexylphthalate
Texanol benzyl phthalate
Neopentyl glycol dibenzoate
Dipropylene glycol dibenzoate
Butyl benzyl phthalate
Propylene glycol dibenzoate
Diethylene glycol dibenzoate
Glycerol tribenzoate Examples of plasticizers which may be used according to the invention are esters comprising: (i) acid residues comprising one or more residues of: phthalic acid, adipic acid, trimellitic acid, benzoic acid, azelaic acid, terephthalic acid, isophthalic acid, butyric acid, glutaric acid, citric acid or phosphoric acid; and (ii) alcohol residues comprising one or more residues of an aliphatic, cycloaliphatic, or aromatic alcohol containing up to about 20 carbon atoms. Further, non-limiting examples of alcohol residues of the plasticizer include methanol, ethanol, propanol, isopropanol, butanol, isobutanol, stearyl alcohol, lauryl alcohol, phenol, benzyl alcohol, hydroquinone, catechol, resorcinol, ethylene glycol, neopentyl glycol, 1,4-cyclohexanedimethanol, and diethylene glycol. The plasticizer also may comprise one or more benzoates, phthalates, phosphates, or isophthalates. In another example, the plasticizer comprises diethylene glycol dibenzoate, abbreviated herein as "DEGDB".

A flame retardant may be added to the polymer blend at a concentration of about 5 weight percent to about 40 weight percent based on the total weight of the polymer blend. Other examples of flame retardant levels are about 7 weight percent to about 35 weight percent, about 10 weight percent to about 30 weight percent, and about 10 weight percent to about 25 weight percent. Preferably, the flame retardant comprises one or more monoesters, diesters, or triesters of phosphoric acid. The phosphorus-containing flame retardant may also function as a plasticizer for the polyester. In another example, the plasticizer comprises diethylene glycol dibenzoate and the flame retardant comprises resorcinol bis(diphenyl phosphate). The flame retardant film or sheet will typically give a V2 or greater rating in a UL94 burn test. In addition, our flame retardant film or sheet typically gives a burn rate of 0 in the Federal Motor Vehicle Safety Standard 302 (typically referred to as FMVSS 302).

The phosphorus-containing flame retardant is preferably miscible with the polyester or the plasticized polyester. The term "miscible", as used herein," is understood to mean that the flame retardant and the plasticized polyester will mix together to form a stable mixture which will not separate into multiple phases under processing conditions or conditions of use. Thus, the term "miscible" is intended include both "soluble" mixtures, in which flame retardant and plasticized polyester form a true solution, and "compatible" mixtures, meaning that the mixture of flame retardant and plasticized polyester do not necessarily form a true solution but only a stable blend. Preferably, the phosphorus-containing compound is a non-halogenated, organic compound such as, for example, a phosphorus acid ester containing organic substituents. The flame retardant may comprise a wide range of phosphorus compounds well-known in the art such as, for example, phosphines, phosphites, phosphinites, phosphonites, phosphinates, phosphonates, phosphine oxides, and phosphates. Examples of phosphorus-containing flame retardants include tributyl phosphate, triethyl phosphate, tributoxyethyl phosphate, t-Butylphenyl diphenyl phosphate, 2-ethylhexyl diphenyl phosphate, ethyl dimethyl phosphate, isodecyl diphenyl phosphate, trilauryl phosphate, triphenyl phosphate, tricresyl phosphate, trixylenyl phosphate, t-butylphenyl diphenylphosphate, resorcinol bis(diphenyl phosphate), tribenzyl phosphate, phenyl ethyl phosphate, trimethyl thionophosphate, phenyl ethyl thionophosphate, dimethyl methylphosphonate, diethyl methylphosphonate, diethyl pentylphosphonate, dilauryl methylphosphonate, diphenyl methylphosphonate, dibenzyl methylphosphonate, diphenyl cresylphosphonate, dimethyl cresylphosphonate, dimethyl methylthionophosphonate, phenyl diphenylphosphinate, benzyl diphenylphosphinate, methyl diphenylphosphinate, trimethyl phosphine oxide, triphenyl phosphine oxide, tribenzyl phosphine oxide, 4-methyl diphenyl phosphine oxide, triethyl phosphite, tributyl phosphite, trilauryl phosphite, triphenyl phosphite, tribenzyl phosphite, phenyl diethyl phosphite, phenyl dimethyl phosphite, benzyl dimethyl phosphite, dimethyl methylphosphonite, diethyl pentylphosphonite, diphenyl methylphosphonite, dibenzyl methylphosphonite, dimethyl cresylphosphonite, methyl dimethylphosphinite, methyl diethylphosphinite, phenyl diphenylphosphinite, methyl diphenylphosphinite, benzyl diphenylphosphinite, triphenyl phosphine, tribenzyl phosphine, and methyl diphenyl phosphine.

The term "phosphorus acid" as used in describing the phosphorus-containing flame retardants of the invention include the mineral acids such as phosphoric acid, acids having direct carbon-to-phosphorus bonds such as the phosphonic and phosphinic acids, and partially esterified phosphorus acids which contain at least one remaining unesterified acid group such as the first and second degree esters of phosphoric acid and the like. Typical phosphorus acids that can be employed in the present invention include, but are not limited to: dibenzyl phosphoric acid, dibutyl phosphoric acid, di(2-ethylhexyl) phosphoric acid, diphenyl phosphoric acid, methyl phenyl phosphoric acid, phenyl benzyl phosphoric acid, hexylphosphonic acid, phenylphosphonic acid tolylphosphonic acid, benzyl phosphonic acid, 2-phenylethylphosphonic acid, methylhexylphosphinic acid, diphenylphosphinic acid, phenylnaphthylphosphinic acid, dibenzylphosphinic acid, methylphenylphosphinic acid, phenylphosphonous acid, tolylphosphonous acid, benzylphosphonous acid, butyl phosphoric acid, 2-ethyl hexyl phosphoric acid, phenyl phosphoric acid, cresyl phosphoric acid, benzyl phosphoric acid, phenyl phosphorous acid, cresyl phosphorous acid, benzyl phosphorous acid, diphenyl phosphorous acid, phenyl benzyl phosphorous acid, dibenzyl phosphorous acid, methyl phenyl phosphorous acid, phenyl phenylphosphonic acid, tolyl methylphosphonic acid, ethyl benzylphosphonic acid, methyl ethylphosphonous acid, methyl phenylphosphonous acid, and phenyl phenylphosphonous acid. The flame retardant typically comprises one or more monoesters, diesters, or triesters of phosphoric acid. In another example, the flame retardant comprises resorcinol bis(diphenyl phosphate), abbreviated herein as "RDP".

Oxidative stabilizers also may be used with polyesters of the present invention to prevent oxidative degradation during processing of the molten or semi-molten material on the rolls. Such stabilizers include esters such as distearyl thiodipropionate or dilauryl thiodipropionate; phenolic stabilizers such as IRGANOX® 1010 available from Ciba-Geigy AG, ETHANOX® 330 available from Ethyl Corporation, and butylated hydroxytoluene; and phosphorus containing stabilizers such as Irgafos® available from Ciba-Geigy AG and WESTON® stabilizers available from GE Specialty Chemicals. These stabilizers may be used alone or in combinations The novel polymer blends preferably contain a phosphorus catalyst quencher component (C), typically one or more phosphorus compounds such as a phosphorus acid, e.g., phosphoric and/or phosphorous acids, or an ester of a phosphorus acid such as a phosphate or phosphite ester. Further examples of phosphorus catalyst quenchers are described in U.S. Pat. Nos. 5,907,026 and 6,448,334. The amount of phosphorus catalyst quencher present typically provides an elemental phosphorus content of about 0 to 0.5 weight percent, preferably 0.05 to 0.3 weight percent, based on the total weight of (A) and (B).

It is also possible to use agents such as sulfoisophthalic acid to increase the melt strength of the polyester to a desirable level. In addition, the polymer blends may contain dyes, pigments, fillers, matting agents, antiblocking agents, antistatic agents, blowing agents, chopped fibers, glass, impact modifiers, carbon black, talc, $TiO_2$ and the like as desired. Colorants, sometimes referred to as added to impart a desired neutral hue and/or brightness to the polyester and the calendered product.

The various components of the polymer blends such as, for example, the flame retardant, release additive, plasticizer, and toners, may be blended in batch, semicontinuous, or continuous processes. Small scale batches may be readily prepared in any high-intensity mixing devices well-known to those skilled in the art, such as Banbury mixers, batch mixers, ribbon blenders, roll mill, torque rheometer, a single screw extruder, or a twin screw extruder. The components also may be blended in solution in an appropriate solvent. The melt blending method includes blending the polyester, plasticizer, flame retardant, additive, and any additional non-polymerized components at a temperature sufficient to melt the polyester. The blend may be cooled and pelletized for further use or the melt blend can be calendered directly from this molten blend into film or sheet. The term "melt" as used herein includes, but is not limited to, merely softening the polyester. For melt mixing methods generally known in the polymer art, see "Mixing and Compounding of Polymers" (I. Manas-Zloczower & Z. Tadmor editors, Carl Hanser Verlag Publisher, 1994, New York, N.Y.). When colored sheet or film is desired, pigments or colorants may be included in the polyester mixture during the reaction of the diol and the dicarboxylic acid or they may be melt blended with the preformed polyester. A preferred method of including colorants is to use a colorant having thermally stable organic colored compounds having reactive groups such that the colorant is copolymerized and incorporated into the polyester to improve its hue. For example, colorants such as dyes possessing reactive hydroxyl and/or carboxyl groups, including, but not limited to, blue and red substituted anthraquinones, may be copolymerized into the polymer chain. When dyes are employed as colorants, they may be added to the polyester reaction process after an ester interchange or direct esterification reaction.

The polymer blends of the present invention are characterized by a novel combination of properties which preferably include polymer blends having a clearness or clarity or haze value measured on ⅛ inch (3.2 mm) molded samples of about 0.2 to 3.0 percent as determined by a HunterLab UltraScan Sphere 8000 using Hunter's Universal Software, where % Haze=100*DiffuseTransmission/TotalTransmission. Diffuse transmission is obtained by placing a light trap on the other side of the integrating sphere from where the sample port is, thus eliminating the straight-thru light path. Only light scattered by greater than 2.5 degrees is measured. Total transmission includes measurement of light passing straight-through the sample and also off-axis light scattered to the sensor by the sample. The sample is placed at the exit port of the sphere so that off-axis light from the full sphere interior is available for scattering. Regular transmission is the name given to measurement of only the straight-through rays—the sample is placed immediately in front of the sensor, which is approximately 20 cm away from the sphere exit port—this keeps off-axis light from impinging on the sample. The polymer blends also exhibit an ASTM D648 a Heat Deflection Temperature, at 455 kilopascals bar (kPa—66 pounds per square inch—psi), of about 80 to 130° C., an ASTM D256 Notched Izod Impact Strength Flexural at 23° C. of about 50 to 1250 joules/m (1 to 25 foot-pounds/inch), an ASTM D790 Modulus of about 700 to 3500 kPa (100 to 500 psi), an ASTM D790 Flexural Strength of about 5000 to 15000 psi. The tensile properties of the blend determined according to ASTM D638 at 23° C. comprise a yield stress of about 31 to 69 megapascal (Mpa—about 4500 psi to 10000 psi), a break stress of about 31 to 69 MPa (about 4500 psi to 10000 psi), and a break strain of at least 50%.

The polyester blend may also be formed into film or sheet using many methods known to those skilled in the art, including but not limited to extrusion and calendaring. In the extrusion process, the polyesters, typically in pellet form, are mixed together in a tumbler and then placed in a hopper of an extruder for melt compounding. Alternatively, the pellets may be added to the hopper of an extruder by various feeders, which meter the pellets in their desired weight ratios. Upon exiting the extruder the now homogenous copolyester blend is shaped into a film. The shape of the film is not restricted in any way. For example, it may be a flat sheet or a tube. The film obtained may be stretched, for example, in a certain direction by from 2 to 6 times the original measurements.

The stretching method for the film may be by any of the methods known in the art, such as, the roll stretching method, the long-gap stretching, the tenter-stretching method, and the tubular stretching method. With the use of any of these methods, it is possible to conduct biaxial stretching in succession, simultaneous biaxial stretching, uni-axial stretching, or a combination of these. With the biaxial stretching mentioned above, stretching in the machine direction and transverse direction may be done at the same time. Also the stretching may be done first in one direction and then in the other direction to result in effective biaxial stretching.

In a general embodiment, the polymer blends of the invention are useful in making calendared film and/or sheet on calendaring rolls. The polymer blend may also comprise one or more plasticizers to increase the flexibility and softness of calendared polyester film, improve the processing of the polyester, and help to prevent sticking of the polyester to the calender rolls. The invention also provides a process for film or sheet by calendering the novel polymer blends and for the film or sheet produced from such calendering processes. The calendered film or sheet typically have a thickness in the range of about 2 mils (0.05 mm) to about 80 mils (2 mm).

While the inherent viscosity (I.V.) of the polyesters of the present invention is generally from about 0.4 to about 1.4 dL/g, other I.V.s are contemplated within the scope of this invention. The inherent viscosity, abbreviated herein as "I.V.", refers to inherent viscosity determinations made at 25° C. using 0.25 gram of polymer per 50 mL of a solvent composed of 60 weight percent phenol and 40 weight percent tetrachloroethane. The basic method of determining the I.V. of the polyesters herein is set forth in ASTM method D2857-95. To obtain superior calendering line speeds, the polyesters of the present invention preferably have an inherent viscosity of about 0.55 to about 0.75 dL/g. Other examples of I.V. values which may be exhibited by the polymer blends are about 0.55 to about 0.70 dL/g, about 0.55 to about 0.65 dL/g, and about 0.60 to about 0.65 dL/g.

In addition to the polyester, the polymer blends described above may comprise an additive that is effective to prevent sticking of the polyester to the calendering rolls when the polyester is used to make calendered film. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 weight percent, based on the total weight percent of the polymer blend. The optimum amount of additive used is determined by factors well known in the art and is dependent upon variations in equipment, material, process conditions, and film thickness. Additional examples of additive levels are about 0.1 to about 5 weight percent and about 0.1 to about 2 weight percent. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another additive which may be used comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms In addition to the polyester, the polymer blends described above may comprise an additive that is effective to prevent sticking of the polyester to the calendering rolls when the polyester is used to make calendered film. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 weight percent, based on the total weight percent of the polymer blend. The optimum amount of additive used is determined by factors well known in the art and is dependent upon variations in equipment, material, process conditions, and film thickness. Additional examples of additive levels are about 0.1 to about 5 weight percent and about 0.1 to about 2 weight percent. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another additive which may be used comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms In addition to the polyester, the polymer blends described above may comprise an additive that is effective to prevent sticking of the polyester to the calendering rolls when the polyester is used to make calendered film. As used herein, the term "effective" means that the polyester passes freely between the calendering rolls without wrapping itself around the rolls or producing an excessive layer of polyester on the surface of the rolls. The amount of additive used in the polyester resin composition is typically about 0.1 to about 10 weight percent, based on the total weight percent of the polymer blend. The optimum amount of additive used is determined by factors well known in the art and is dependent upon variations in equipment, material, process conditions, and film thickness. Additional examples of additive levels are about 0.1 to about 5 weight percent and about 0.1 to about 2 weight percent. Examples of additives of the present invention include fatty acid amides such as erucylamide and stearamide; metal salts of organic acids such as calcium stearate and zinc stearate; fatty acids such as stearic acid, oleic acid, and palmitic acid; fatty acid salts; fatty acid esters; hydrocarbon waxes such as paraffin wax, phosphoric acid esters, polyethylene waxes, and polypropylene waxes; chemically modified polyolefin waxes; ester waxes such as carnauba wax; glycerin esters such as glycerol mono- and di-stearates; talc; microcrystalline silica; and acrylic copolymers (for example, PARALOID® K175 available from Rohm & Haas). Typically, the additive comprises one or more of: erucylamide, stearamide, calcium stearate, zinc stearate, stearic acid, montanic acid, montanic acid esters, montanic acid salts, oleic acid, palmitic acid, paraffin wax, polyethylene waxes, polypropylene waxes, carnauba wax, glycerol monostearate, or glycerol distearate.

Another additive which may be used comprises a fatty acid or a salt of a fatty acid containing more than 18 carbon atoms and (ii) an ester wax comprising a fatty acid residue containing more than 18 carbon atoms and an alcohol residue containing from 2 to about 28 carbon atoms. The ratio of the fatty acid or salt of a fatty acid to the ester wax may be 1:1 or greater. In this embodiment, the combination of the fatty acid or fatty acid salt and an ester wax at the above ratio gives the additional benefit of providing a film or sheet with a haze value of less than 5%. The additives with fatty acid components containing 18 or less carbon atoms which all the reactants are added at the beginning of the process except that one or more of the products are removed continuously as the reaction progresses. The process is operated advantageously as a continuous process for economic reasons and to produce superior coloration of the polymer as the polyester may deteriorate in appearance if allowed to reside in a reactor at an elevated temperature for too long a duration.

In the calendaring process, higher molecular weight plasticizers are preferred to prevent smoking and loss of plasticizer during the calendering process. The preferred range of plasticizer content will depend on the properties of the base polyester and the plasticizer. In particular, as the Tg of the polyester as predicted by the well-known Fox equation (T. G. Fox, Bull. Am. Phys. Soc., 1, 123 (1956)) decreases, the amount of plasticizer needed to obtain a polymer blend that may be calendered satisfactorily also decreases. Typically, the plasticizer comprises from about 5 to about 50 weight percent (weight percent) of the polymer blend based on the total weight of the polymer blend. Other examples of plasticizer levels are about 10 to about 40 weight percent, about 15 to about 40 weight percent, and about 15 to about 30 weight percent of the polymer blend.

Our invention also includes a process for the manufacture of film or sheet, comprising any of the polymer blends of the invention. In some embodiments, a process is disclosed for making such articles, film, sheet, and/or fibers comprising the steps of injection molding, extrusion blow molding, film/sheet extruding or calendering the polymer blend(s) of the invention.

For the purposes of this invention, the abbreviations PETG (for compositions with up to 50 mol % CHDM) and PCTG (for compositions with greater than 50 mol % CHDM) are often used to identify these materials.

The present invention is illustrated in greater detail by the specific examples presented below. It is to be understood that these examples are illustrative embodiments and are not intended to be limiting of the invention, but rather are to be construed broadly within the scope and content of the appended claims.

EXAMPLES

The polymer blends provided by the present invention and the preparation thereof, including the preparation of representative polyesters, are further illustrated by the following examples. The glass transition temperatures (Tg's) of the blends were determined using a TA Instruments 2950 differential scanning calorimeter (DSC) at a scan rate of 20° C./minute. The diol content of the copolyester portion of these blends was determined by proton nuclear magnetic resonance spectroscopy (NMR). Clarity was determined visually and by a HunterLab UltraScan Sphere 8000 using Hunter's Universal Software. % Haze=100*DiffuseTransmission/TotalTransmission. The miscibility of the blends was determined by differential scanning calorimetry and by observation of the clarity of pressed films and molded objects.

Copolyesters constituting polyester component (B) were prepared from dimethyl terephthalate (DMT) and varying amounts of neopentyl glycol (NPG) and 1,4-cyclohexanedimethanol (CHDM). The transesterification of DMT with a mixture of NPG and CHDM and the polymerization were carried out in the presence of a titanium catalyst introduced as an n-butanol solution of titanium tetraisopropoxide contain 2.42 weight percent titanium. The reactants were heated first at 200° C. for 2 hours with agitation and then at 260° C. for 0.5 hour. The pressure then was reduced at a rate of 13 Torr per minute and the temperature was increased to 270° C. When the pressure reached 4 Torr, the polymerization mixture was maintained at 270° C. for varying lengths of time (Polym Time in Table I). At the conclusion of the polymerization period, the pressure of the polymerization vessel was increase to ambient pressure with a nitrogen purge. The polymer was extruded and pelletized. The resultant compositions and inherent viscosity of these copolyesters are shown in Table I wherein NPG/CHDM are the mole percentages of NPG and CHDM residues present in polymer, the values for DMT, NPG and CHDM are the amounts in kg of each reactant utilized in the polymer preparation and the values given for Ti are parts per million by weight Ti present in the polymer. Inherent viscosity for each copolyester was determined as described above and Polym Time (minutes) has the meaning given above.

TABLE I

| Polyester | NPG/CHDM | DMT | NPG | CHDM | Ti | I.V. | Polym Time |
|---|---|---|---|---|---|---|---|
| A | 62/38 | 42.33 | 25.19 | 12.25 | 50 | 0.782 | 155 |
| B | 60/40 | 42.33 | 24.50 | 13.20 | 47 | 0.737 | 145 |
| C | 53/47 | 41.66 | 22.45 | 15.31 | 48 | 0.707 | 135 |
| D | 41/59 | 40.89 | 19.07 | 19.12 | 45 | 0.752 | 135 |
| E | 27/73 | 39.72 | 14.37 | 24.32 | 50 | 0.746 | 160 |
| F | 17/83 | 39.72 | 11.50 | 28.30 | 55 | 0.758 | 205 |

Comparative Example 1 and Examples 1-5

The copolyesters listed in Table I were blended with a bisphenol A polycarbonate powder (MAKROLON 2608) and a phosphorus additive. The copolyesters were dried at 80° C. and the bisphenol A polycarbonate were dried at 100° C. overnight. The phosphorus concentrate was prepared by first hydrolyzing Weston 619, a distearyl pentaerythritol diphosphite available from GE Specialty Plastics, by melting it and soaking it in water and allowing the excess water to evaporate. The bisphenol A polycarbonate then is added to the now-hydrolyzed molten Weston 619 at ambient temperature and mixed until it a homogeneous solution is formed. This material then is extruded in a twin-screw extruder at 280° C. and pelletized. The final phosphorus content of the pellets is 5 weight percent elemental phosphorus based on total pellet weight. In each example, 75 parts by weight of each of the copolyesters in prepared as described above and set forth in Table I, 25 parts by weight bisphenol A polycarbonate and 5 parts by weight of the phosphorus additive were blended at 270° C. in a Werner Pfleider 30 mm twin-screw extruder equipped with moderate mixing screws. The blends were dried overnight at 80° C. and then injection molded into flex and tensile bars with the dimensions of ⅛ inch (3.2 mm) at 270° C. on a Toyo 90 injection molding machine. The properties of the blends are shown in Tables II and III. Heat Deflection Temperature (HDT), at 455 kilopascals (about 66 psi), was determined according to ASTM D648. Notched and Unnotched Izod Impact Strength was determined at 23° C. according to ASTM D256. Flexural Modulus (Flex Modulus) and flexural strength were determined according to ASTM D790. Tensile properties were determined according to ASTM D638. In Table II, PE is the copolyester used; Appear refers to the visual appearance of the injection molded test bars; Tg is the second cycle glass transition temperature determined as described herein; Flex Modulus, D790 Yield Stress, Break Stress and D638 Yield Stress values are given in Mpa; D790 Yield Stress, Break Stress and D638 Yield Stress values are percentages; HDT is given in ° C.; Notched and Unnotched Izod values are given in foot pounds per inch (53 Joules per meter=1 foot pound per inch); and Enrgy/Vol@Break values are given in Mpa and refers to the total area under the stress strain curve and is a measure of toughness. In Table III, the % haze is shown as determined by a HunterLab UltraScan Sphere 8000 using Hunter's Universal Software. % Haze=100* DiffuseTransmission/TotalTransmission. Diffuse transmission is obtained by placing a light trap on the other side of the integrating sphere from where the sample port is, thus eliminating the straight-thru light path. Only light scattered by greater than 2.5 degrees is measured. Total transmission includes measurement of light passing straight-through the sample and also off-axis light scattered to the sensor by the sample. The sample is placed at the exit port of the sphere so that off-axis light from the full sphere interior is available for scattering.

TABLE II

| | | | | ASTM D790 | | | | | | ASTM D638 | | | | |
|---|---|---|---|---|---|---|---|---|---|---|---|---|---|---|
| Ex. | PE | Appear | Tg | Flex Modulus | Yield Strain | Yield Stress | HDT | Notched Izod | Unnotched Izod | Break Strain | Break Stress | Enrgy/Vol @Break | Yield Strain | Yield Stress |
| C-1 | A | Hazy | — | 2351.6 | 5.014 | 79.2 | 80 | 1 | 59 | 126 | 42.3 | 6209 | 5 | 53.2 |
| 1 | B | Clear | 89 | 2247.9 | 5.149 | 79.7 | 78 | 1 | 55 | 98 | 38.1 | 4723 | 5 | 53.1 |
| 2 | C | Clear | 91 | 2219.5 | 5.283 | 78.5 | 82 | 1 | 48 | 123 | 44.9 | 6213 | 5 | 52.2 |
| 3 | D | Clear | 94 | 2026.8 | 5.59 | 76.6 | 82 | 1 | 54 | 152 | 48.6 | 8058 | 5 | 51.3 |
| 4 | E | Clear | 97 | 2005.6 | 5.833 | 74.8 | 86 | 10 | 54 | 156 | 51.3 | 8426 | 5 | 50.0 |
| 5 | F | Clear | 100 | 1982.3 | 6.184 | 74.6 | 85 | 22 | 55 | 185 | 53.5 | 10464 | 5 | 48.7 |

TABLE III

| Ex. | PE | % Haze | Total Transmission | Diffuse Transmission |
|---|---|---|---|---|
| C-1 | A | 15.8 | 70.8 | 11.2 |
| 1 | B | 2.6 | 85.3 | 2.2 |
| 2 | C | 0.7 | 88.6 | 0.6 |
| 3 | D | 0.7 | 89.1 | 0.6 |
| 4 | E | 0.5 | 88.2 | 0.4 |
| 5 | F | 0.5 | 89.1 | 0.5 |

The invention has been described in detail with particular reference to preferred embodiments thereof, but it will be understood that variations and modifications can be effected within the spirit and scope of the invention.

We claim:

1. A clear polymer blend comprising:
   (A) about 1 to 99 percent by weight of at least one polycarbonate (A) comprising:
      (1) a diol component comprising about 90 to 100 mole percent 4,4'-isopropylidenediphenol residues, and
      (2) 0 to about 10 mole percent modifying diol residues; wherein the total mole percent of diol residues is equal to 100 mole percent; and
   (B) about 99 to 1 percent by weight of at least one polyester (B) comprising
      (1) diacid residues comprising about 70 to 100 mole percent dicarboxylic acid units selected from the group consisting of terephthalic acid residues, isophthalic acid residues, or mixtures thereof; and 0 to about 30 mole percent of modifying dicarboxylic acid residues having about 2 to 20 carbons, wherein the total mole percent of diacid residues is equal to 100 mole percent; and (2) diol residues comprising about 40 to 99.9 mole percent 1,4-cyclohexanedimethanol residues, 0.1 to about 60 mole percent neopentyl glycol residues, 0 to about 10 mole percent modifying diol residues having 3 to 16 carbons, and 0 mole percent ethylene glycol residues, wherein the total mole percent of diol residues is equal to 100 mole percent; and wherein the total weight percent of said polycarbonate (A) and polyester (B) is equal to 100 weight percent.

2. A polymer blend according to claim 1 wherein polyester (B) comprises:
(1) diacid residues comprising at least 70 mole percent of terephthalic acid residues and 0 to about 30 mole percent isophthalic acid residues; and
(2) dial residues comprising about 40 to 99.9 mole percent 1,4-cyclohexanedimethanol residues and about 0.1 to 60 mole percent neopentyl glycol residues.

3. A polymer blend according to claim 2 wherein polyester (B) comprises isophthalic acid residues in the amount of 0.1 to 30 mole percent.

4. A polymer blend according to claim 3 wherein polyester (B) comprises about 80 to 100 mole percent of terephthalic acid residues.

5. A polymer blend according to claim 4 wherein polyester (B) comprises about 90 to 100 mole percent of terephthalic acid residues.

6. A polymer blend according to claim 1 wherein polyester (B) comprises about 45 to 95 mole percent of 1,4-cyclohexanedimethanol.

7. A polymer blend according to claim 6 wherein polyester (B) comprises about 50 to 80 mole percent of 1,4-cyclohexanedimethanol.

8. A polymer blend according to claim 7 wherein polyester (B) comprises about 55 to 70 mole percent of 1,4-cyclohexanedimethanol.

9. A polymer blend according to claim 8 wherein polyester (B) comprises about 58 to 68 mole percent of 1,4-cyclohexanedimethanol.

10. A polymer blend according to claim 1 wherein polyester (B) comprises about 5 to 55 mole percent of neopentyl glycol.

11. A polymer blend according to claim 10 wherein polyester (B) comprises about 20 to 50 mole percent of neopentyl glycol.

12. A polymer blend according to claim 11 wherein polyester (B) comprises about 30 to 45 mole percent of neopentyl glycol.

13. A polymer blend according to claim 12 wherein polyester (B) comprises about 32 to 42 mole percent of neopentyl glycol.

14. A polymer blend according to claim 1 wherein polyester (B) comprises 0 to about 5 mole percent modifying diol residues having 3 to 16 carbons.

15. A polymer blend according to claim 14 wherein polyester (B) comprises 0.1 to about 5 mole percent modifying diol residues having 3 to 16 carbons.

16. A polymer blend according to claim 15 wherein polyester (B) comprises modifying diol residues which comprise 1,2-propanediol, 1,4-butanediol, 1,5-pentanediol, diethylene glycol, 1,6-hexanediol, 1,8-octanediol, 2,2,4-trimethyl-1,3-pentanediol, 2,2,4,4-tetramethyl-1,3-cyclobutanediol, 1,3-cyclohexanedimethanol, bisphenol A, or polyalkylene glycol.

17. A polymer blend according to claim 1 wherein said polycarbonate (A) comprises 0.1 to 10 mole percent of modifying diol residues.

18. A polymer blend according to claim 1 comprising:
(A) about 0.1 to 75 percent by weight of at least one polycarbonate (A) comprising:
(1) a diol component comprising about 90 to 100 mole percent 4,4'-isopropylidenediphenol residues, and
(2) 0 to about 10 mole percent modifying diol residues; wherein the total mole percent of diol residues is equal to 100 mole percent; and
(B) about 99.9 to 25 percent by weight of at least one polyester (B) comprising:
(1) diacid residues comprising about 70 to 100 mole percent of terephthalic acid residues; and 0 to about 30 mole percent of modifying dicarboxylic acid residues having about 2 to 20 carbons, wherein the total mole percent of diacid residues is equal to 100 mole percent; and
(2) diol residues comprising about 50 to 80 mole percent 1,4-cyclohexanedimethanol residues, 20 to about 50 mole percent neopentyl glycol residues, 0 to about 10 mole percent modifying diol residues having 3 to 16 carbons, and 0 mole percent ethylene glycol residues, wherein the total mole percent of diol residues is equal to 100 mole percent; and wherein the total weight percent of said polycarbonate (A) and polyester (B) is equal to 100 weight percent.

19. A polymer blend according to claims 1 or 18 wherein polyester (B) has a glass transition temperature of about 40 to 140° C. and an inherent viscosity (I.V.) of about 0.3 to 1.2 dL/g as determined at 25° C. using 0.50 gram of polymer per 100 mL of a solvent composed of 60 weight percent phenol and 40 weight percent tetrachloroethane.

20. A polymer blend according to claim 19 wherein polyester (B) has a glass transition temperature of about 60 to 100° C. and an inherent viscosity (I.V.) of about 0.6 to 1.1 dL/g as determined at 25° C. using 0.50 gram of polymer per 100 mL of a solvent composed of 60 weight percent phenol and 40 weight percent tetrachloro-ethane.

21. A polymer blend according to claims 1 or 18 wherein the blend of polycarbonate (A) and polyester (B) has a clarity or haze value of about 0.2 to 3.0 as determined by a HunterLab UltraScan Sphere 8000 and the total weight percent of said polycarbonate (A) and polyester (B) is equal to 100 weight percent.

22. A polymer blend according to claims 1 or 18 where the polymer blend has a single glass transition temperature.

23. A polymer blend according to claims 1 or 18 wherein the total weight percent of polycarbonate (A) is from 0.1 to 50 weight.

24. A polymer blend according to claim 23 wherein the total weight percent of polycarbonate (A) is from 0.1 to 30 weight percent and wherein the total weight percent of said polycarbonate (A) and polyester (B) is equal to 100 weight percent.

25. A polymer blend according to claim 24 wherein the total weight percent of polycarbonate (A) is from 10 to 30 weight.

26. A polymer blend according to claim 25 wherein the total weight percent of polycarbonate (A) is from 15 to 30 weight percent and wherein the total weight percent of said polycarbonate (A) and polyester (B) is equal to 100 weight percent.

27. A polymer blend according claims 1 or 18 wherein polyester (B) comprises diol residues comprising about 40 to 99 mole percent 1,4-cyclohexanedimethanol residues and about 1 to 60 mole percent neopentyl glycol residues; and the blend optionally comprises a component (C) which comprises one or more phosphorus catalyst quenchers which provide an elemental phosphorus concentration of about 0 to 0.5 weight percent based on the weight of components (A) and (B).

28. A polymer blend according to claim 27 wherein component (C) comprises one or more phosphorus catalyst quenchers which provide an elemental phosphorus concentration of about 0.05 to 0.3 weight percent based on the weight of components (A) and (B).

29. A clear polymer blend comprising:
 (A) about 1 to 99 percent by weight of at least one polycarbonate (A) comprising:
  (1) a diol component comprising about 90 to 100 mole percent 4,4'-isopropylidenediphenol residues, and
  (2) 0 to about 10 mole percent modifying diol residues; wherein the total mole percent of diol residues is equal to 100 mole percent; and
 (B) about 99 to 1 percent by weight of at least one polyester (B) comprising
  (1) diacid residues comprising about 80 to 100 mole percent of terephthalic acid residues; 0 to 20 mole percent isophthalic acid, and 0 to about 30 mole percent modifying dicarboxylic acid, wherein the total mole percent of diacid residues is equal to 100 mole percent; and
  (2) diol residues comprising about 50 to 80 mole percent 1,4-cyclohexanedimethanol residues, 20 to about 50 mole percent neopentyl glycol residues, 0 to about 10 mole percent modifying diol residues, and 0 mole percent ethylene glycol residues, wherein the total mole percent of diol residues is equal to 100 mole percent; and
 wherein the total weight percent of said polycarbonate (A) and polyester (B) is equal to 100 weight percent.

30. A polymer blend according to claim 29 wherein polyester (B) comprises no modifying glycol residues.

31. A polymer blend according to claim 30 wherein the diacid and diol residues of polyester (B) consist essentially of:
 (1) diacid residues comprising at least 80 mole percent of terephthalic acid residues and 0 to about 30 mole percent isophthalic acid residues; and
 (2) diol residues comprising about 50 to 80 mole percent 1,4-cyclohexanedimethanol residues and about 20 to 50 mole percent neopentyl glycol residues.

32. A polymer blend according to claim 31 wherein polyester (B) comprises about 85 to 100 mole percent of terephthalic acid residues.

33. A polymer blend according to claim 32 wherein polyester (B) comprises about 90 to 100 mole percent of terephthalic acid residues.

34. A polymer blend according to claim 29 wherein polyester (B) comprises about 55 to 75 mole percent of 1,4-cyclohexanedimethanol.

35. A polymer blend according to claim 34 wherein polyester (B) comprises about 55 to 70 mole percent of 1,4-cyclohexanedimethanol.

36. A polymer blend according to claim 35 wherein polyester (B) comprises about 58 to 68 mole percent of 1,4-cyclohexanedimethanol.

37. A polymer blend according to claim 29 wherein polyester (B) comprises about 25 to 45 mole percent of neopentyl glycol.

38. A polymer blend according to claim 37 wherein polyester (B) comprises about 30 to 45 mole percent of neopentyl glycol.

39. A polymer blend according to claim 38 wherein polyester (B) comprises about 32 to 42 mole percent of neopentyl glycol.

40. A polymer blend according to claim 29 wherein polyester (B) comprises 0 to about 5 mole percent modifying diol residues having 3 to 20 carbon atoms.

41. A polymer blend according to claim 40 wherein polyester (B) comprises 0.1 to about 5 mole percent modifying diol residues having 3 to 16 carbon atoms.

42. A polymer blend according to claim 29 comprising:
 (A) about 0.1 to 50 percent by weight of at least one polycarbonate (A) comprising:
  (1) a diol component comprising about 90 to 100 mole percent 4,4'-isopropylidenediphenol residues, and
  (2) 0 to about 10 mole percent modifying diol residues; wherein the total mole percent of diol residues is equal to 100 mole percent; and
 (B) about 99.9 to 50 percent by weight of at least one polyester (B) comprising
  (1) diacid residues comprising about 80 to 100 mole percent of terephthalic acid residues; and 0 to about 20 mole percent of modifying dicarboxylic acid residues, wherein the total mole percent of diacid residues is equal to 100 mole percent; and
  (2) diol residues comprising about 50 to 80 mole percent 1,4-cyclohexanedimethanol residues, 20 to about 50 mole percent neopentyl glycol residues, and 0 to about 10 mole percent modifying diol residues, and 0 mole percent ethylene glycol residues, wherein the total mole percent of diol residues is equal to 100 mole percent; and
 wherein the total weight percent of said polycarbonate (A) and polyester (B) is equal to 100 weight percent.

43. A polymer blend according to claims 29 or 42 wherein polyester (B) has a glass transition temperature of about 40 to 140° C. and an inherent viscosity (I.V.) of about 0.3 to 1.2 dL/g as determined at 25° C. using 0.50 gram of polymer per 100 mL of a solvent composed of 60 weight percent phenol and 40 weight percent tetrachloroethane.

44. A polymer blend according to claims 29 or 42 wherein the blend of polycarbonate (A) and polyester (B) has a clarity or haze value of about 0.2 to 3.0 as determined by a HunterLab UltraScan Sphere 8000 and the total weight percent of said polycarbonate (A) and polyester (B) is equal to 100 weight percent.

45. A polymer blend according to claim 29 where the blend has a single glass transition temperature.

46. A polymer blend according to claim 29 wherein the total weight percent of polycarbonate (A) is from 0.1 to 50 weight.

47. A polymer blend according to claim 46 wherein the total weight percent of polycarbonate (A) is from 0.1 to 30 weight percent.

48. A polymer blend according to claim 47 wherein the total weight percent of polycarbonate (A) is from 10 to 30 weight percent and wherein the total weight percent of said polycarbonate (A) and polyester (B) is equal to 100 weight percent.

49. A polymer blend according to claim 48 wherein the total weight percent of polycarbonate (A) is from 15 to 30 weight percent and wherein the total weight percent of said polycarbonate (A) and polyester (B) is equal to 100 weight percent.

50. A polymer blend according to claim 29 wherein polycarbonate (A) comprise from 0.1 to 10 mole percent of modifying diol residues.

51. A polymer blend according to claims 1 or 29 wherein polyester (B) comprises about 0.01 to about 10.0 weight percent of residues of one or more branching agents, based on the total weight of polyester (B).

52. A polymer blend according to claim 51 wherein polyester (B) comprises about 0.05 to about 5 weight percent of residues of said one or more branching agents, based on the total weight of polyester (B).

53. A polyester blend according to claim 52 wherein polyester (B) comprises about 0.01 to about 1 weight percent, based on the total weight of said polyester (B), of residues of one or more branching agents selected from the group consisting of monomers having 3 or more carboxyl substituents, hydroxyl substituents, or a combination thereof.

54. A polymer blend according to claim 53 wherein polyester (B) comprises about 0.1 to about 0.7 mole percent of one or more residues of branching agents selected from the group consisting of trimellitic anhydride, pyromellitic dianhydride, glycerol, sorbitol, 1,2,6-hexanetriol, pentaerythritol, trimethylolethane, or trimesic acid.

55. A polymer blend according to of claims 1 or 29 further comprising one or more plasticizers.

56. A polymer blend according to claims 1 or 29 further comprising about 5 to about 40 weight percent, based on the total weight of said polymer blend, of a flame retardant.

57. A polymer blend according to claim 56 comprising one or flame retardants selected from the group consisting of phosphorous-containing flame retardants.

58. A polymer blend according to claim 57 comprising one or more monoesters, diesters, or triesters of phosphoric acid.

59. A method for producing the polymer blend of claims 1 or 29 which comprises the steps of:

(a) blending said polycarbonate (A) and said polyester (B);

(b) before, during or after the blending, melting polycarbonate (A) and polyester (B) to form after the blending and melting, a melt blend; and (c) cooling the melt blend to form a blend composition.

60. A process for the manufacture of a film or sheet comprising the steps of extruding or calendering a polymer blend according to claims 1 or 29.

61. A film or sheet comprising a polymer blend according to claims 1 or 29.

62. A film or sheet according to claim 61 wherein said film or sheet was produced by extrusion or calendaring.

63. A molded or formed article comprising a polymer blend according to claims 1 or 29.

64. A molded or formed article according to claim 63 wherein said article was produced by injection molding or extrusion blow molding.

65. The polymer blend according to claims 1 or 29, wherein polycarbonate (A) has a melt flow rate between 2 and 18 as determined by ASTM D1238 at a temperature of 300 degrees C. and using a weight of 1.2 kilograms.

66. The blend according to claims 1 or 29, wherein polycarbonate (A) comprises a branching agent.

67. A shaped article which is extrusion blow-molded from the polymer blend of claims 1 or 29.

68. A extrusion blow-molded article prepared from the polymer blend of claims 1 or 29.

69. A fiber prepared from the polymer blend of claims 1 or 29.

* * * * *

UNITED STATES PATENT AND TRADEMARK OFFICE
CERTIFICATE OF CORRECTION

PATENT NO. : 7,297,736 B2  Page 1 of 1
APPLICATION NO. : 10/975257
DATED : November 20, 2007
INVENTOR(S) : Hale et al.

It is certified that error appears in the above-identified patent and that said Letters Patent is hereby corrected as shown below:

Correction(s)

Column 25, Claim 2, Line 15, "dial" should read --diol--

Column 26, Claim 20, Line 27, "tetrachloro-ethane" should read --tetrachloroethane--

Column 27, Claim 31, Line 37, "claim 30" should read --claim 29--

Column 30, Claim 65, Line 23, "C." should read --C--

Signed and Sealed this

Twenty-ninth Day of April, 2008

JON W. DUDAS
*Director of the United States Patent and Trademark Office*